United States Patent [19]

Kurz et al.

[11] Patent Number: 5,554,917
[45] Date of Patent: Sep. 10, 1996

[54] APPARATUS FOR REGULATING THE POWER CONSUMPTION OF A VACUUM CLEANER

[75] Inventors: Gerhard Kurz, Industriestrasse W-75382, Althengstett; Manfred Kraft, Neubulach, both of Germany

[73] Assignee: Gerhard Kurz, Althengstett, Germany

[21] Appl. No.: 297,390

[22] Filed: Aug. 11, 1994

[30] Foreign Application Priority Data

Aug. 12, 1993 [DE] Germany ............... 43 27 070.0

[51] Int. Cl.$^6$ ........................................ H02P 5/00
[52] U.S. Cl. ................... 318/805; 15/319; 318/809
[58] Field of Search ............................. 318/798–805; 388/804, 805, 811, 812, 819, 820, 813, 903, 907.5, 928.1; 15/319, 339, 307

[56] References Cited

U.S. PATENT DOCUMENTS

| Re. 34,286 | 6/1993 | Toyoshima et al. | 15/319 |
|---|---|---|---|
| 4,683,411 | 7/1987 | Hamilton, Jr. et al. | 318/706 |
| 4,695,779 | 9/1987 | Yates | 318/484 |
| 4,970,656 | 11/1990 | Lo et al. | 364/481 |
| 5,182,833 | 2/1993 | Yamaguchi et al. | 15/319 |
| 5,276,939 | 1/1994 | Uenishi | 15/319 |
| 5,294,872 | 3/1994 | Koharagi et al. | 318/254 |
| 5,323,483 | 6/1994 | Baeg | 388/811 |
| 5,343,122 | 8/1994 | Sugimori et al. | 315/209 R |
| 5,381,584 | 1/1995 | Jyoraku et al. | 15/319 |
| 5,410,236 | 4/1995 | Arroubi | 388/936 X |

FOREIGN PATENT DOCUMENTS

| 0264728 | 4/1988 | European Pat. Off. . |
|---|---|---|
| 0320878 | 6/1989 | European Pat. Off. . |
| 0370610 | 5/1990 | European Pat. Off. . |
| 0379680 | 12/1992 | European Pat. Off. . |
| 1066661 | 3/1960 | Germany . |
| 4116407 | 11/1992 | Germany . |
| 4327070 | 4/1995 | Germany . |
| 499225 | 12/1970 | Switzerland . |
| 1470239 | 4/1977 | United Kingdom . |
| 2058405 | 4/1981 | United Kingdom . |
| 9310463 | 5/1993 | WIPO . |

OTHER PUBLICATIONS

European Search Report: EP94110631.2, 3 pages: German.
Tomokazu, JP63194593, Abstract of Vacuum Cleaner, 1 page, May 1987.
Haruo et al., JP63249491, Abstract of Vacuum Cleaner, 1 page Mar. 1987.
Haug et al., *Precision rectifer circuit with adjustable form factor*, pp. 375–377, German, 1982.
*Guide to Selecting rms Voltmeters*, Instruments and Control Systems, Feb. 1973, pp. 50–52.
Wegner, *Elektronik in Elektrokleingeraten*, 19/81— 1354–1356, German.
Office Action of the German Patent Office, dated Dec. 28, 1993, German.
Peschl, *Was ist "echte" Effektivwertmessung?*, Funkschau 1978, Heft 22, pp. 1093–1096, (105–108).

*Primary Examiner*—Jonathan Wysocki
*Attorney, Agent, or Firm*—Darby & Darby, P.C.

[57] ABSTRACT

In an apparatus for regulating the power consumption of a vacuum cleaner, it is proposed to detect the pulsating alternating current present at the driving electric motor and delivered by a phase-angle circuit by means of a parallel voltage sensor, rectify it, smooth it, digitize it, and, on the basis of data stored in tabular form from a memory arranged in a microprocessor, convert it into a true effective value of the motor voltage; and subsequently to compare it with various associated respective manually defined power data and to activate the phase-angle circuit so that irrespective of fluctuations or different power system alternating voltages or frequencies, motor output is regulated to constant values corresponding to the manual setting.

9 Claims, 3 Drawing Sheets

APPARATUS FOR REGULATING THE POWER CONSUMPTION OF A VACUUM CLEANER

BACKGROUND OF THE INVENTION

The invention is based on an apparatus for regulating the power consumption of a vacuum cleaner.

It is known to provide, in a vacuum cleaner, an automatic suction power controller (EP 0 379 680 B1) in which the electric motor driving the fan of the vacuum cleaner is activated by a phase-angle control circuit, and its rotation speed and power consumption are influenced so that a vacuum which is substantially constant, or changes only within a predefined bandwidth, is generated in the suction region of the vacuum cleaner.

For this purpose two vacuum switches, usually membrane-controlled, and set to different vacuum response thresholds, are provided and are linked to an activation circuit for the electric motor comprising the phase-angle control circuit in such a way that when both vacuum switches are open, the phase-angle control circuit reacts so as to raise power output; while when both vacuum switches are closed, the electric motor is activated toward lower power consumption, so that when one of the vacuum switches is closed and the other open, the desired power level is achieved and is also substantially maintained by means of the response characteristics of the control circuit to the vacuum switch.

This automatic approximate maintenance of constant power consumption in a vacuum cleaner motor can be supplemented with additional switches which define further, manually adjustable power output modes when actuated by the user.

In a system of this kind for controlling the power consumption of a vacuum cleaner fan motor, problems can result from the circumstance that the line voltage can exhibit fluctuations, which are compensated for by the vacuum switches under automatic control, but in the manually selectable switch positions can lead to considerable differences in output. Such problems can occur even with ordinary fluctuations in line voltage, since the line voltage of a load is squared when incorporated into the power definition; it therefore has a particularly serious effect when different line voltages are used because of national regulations, so that line voltage often fluctuates between 190 and 260 volts in different regions, in some cases additionally complicated by variations in line frequency.

It is possible to define different output data for each regional or national area. This is nevertheless tedious and expensive for the production of electrical appliances in general and vacuum cleaners in particular, so that the underlying object of the invention is to provide a remedy here, and to ensure automatic vacuum cleaner operation regardless of fluctuations in line voltage and frequency, so that even when certain output data are selected manually (for example setting to 300-watt operation or 500-watt operation as a supplement to automatic vacuum regulation, or a "boost" mode), said data are kept constant.

ADVANTAGES OF THE INVENTION

The apparatus according to the invention for regulating the power consumption of a vacuum cleaner achieves this object with the features of claim 1, and has the advantage that when desired output data are set (manually) by defining constant stored comparative values for setpoint voltage, such data can also be effectively achieved and maintained by the vacuum cleaner entirely independent of a considerable permissible fluctuation in supplied line voltage or line frequency; the advantageous result is to eliminate problems in detecting and determining the effective voltage values delivered to an electric motor. Such problems occur when the voltage delivered to an electric motor via a phase-angle controller exhibits defective or pulsing behavior, so that simple integration of the delivered voltage, for example at an RC element for determining the effective value, would be insufficient or lead to erroneous results.

In this connection, the invention advantageously makes use of stored comparison tables, which—while defining an interrogated and subsequently digitized voltage value for the supply voltage supplied to an electric motor via the phase-angle controller and incorporating the particular phase angle maintained by the phase-angle controller as well as other data, if applicable—indicate the actual effective value of the voltage delivered to the electric motor for comparison with stored setpoint voltages that are based on a manual input.

The features listed in the subsidiary claims allow advantageous developments and improvements of the invention. Particularly advantageous is the incorporation of the apparatus, which to this extent provides automatic regulation to constant power consumption, into the region of a microprocessor that also comprises the stored comparative values, possibly in connection with an additional external memory, activates corresponding indicator lamps for the various operating modes that are engaged, and in particular is capable of acting on the phase-angle controller in such a way as to ensure the desired regulation to constant output.

BRIEF DESCRIPTION OF THE DRAWINGS

An exemplary embodiment of the invention is depicted in the drawings and will be explained further in the description below. In the drawings.

DESCRIPTION OF EXEMPLARY EMBODIMENTS

Figure 1:
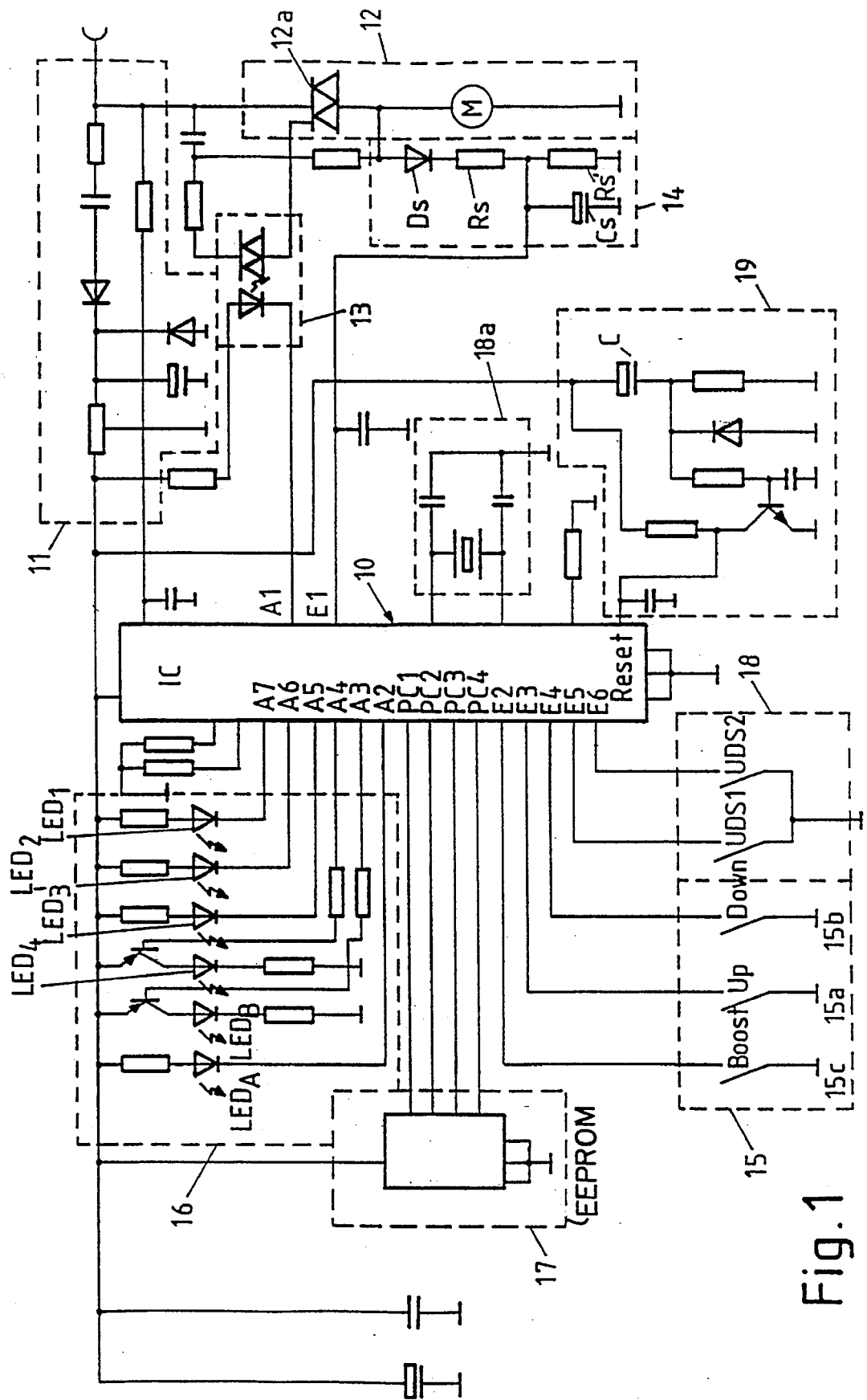
FIG. 1 shows, in a depiction partly in detail, the regulation circuit for maintaining a constant power consumption for a vacuum cleaner motor.

The basic idea of the present invention consists, in order to keep the power consumption of a vacuum cleaner drive motor constant regardless of fluctuations or changes in line voltage or changes in line frequency, of detecting with the aid of suitable sensor means the voltage occurring directly at the electric motor and utilizing it for regulation, by comparing said voltage, after suitable conditioning, with predefined setpoints for the particular operating mode, striving for actual effective values and incorporating stored table values.

The electronic control and regulation circuit for operating a vacuum cleaner motor, depicted in FIG. 1 and for the most part having discrete circuit elements, comprises a central electronic circuit 10, preferably in the form of a microprocessor or microcomputer, which hereinafter will also be referred to as an IC and which supplies data or signals to circuit blocks yet to be explained below, while other circuit blocks are activated by the IC.

A power circuit element 11 is provided to supply power; the phase-angle circuit 12 is activated in a voltage-free manner from output A1 of the IC via an optical coupler 13;

a voltage sensor 14, which detects the supply voltage of the electric motor M and delivers it to an input E1 of the IC, is connected in parallel with the electric motor M, which acts as the fan drive motor of the vacuum cleaner and is supplied with defective half-sine waves from the triac 12a of the phase-angle circuit 12.

On the other side of the IC, the activation circuit structure is completed by a manual switch block 15 which operates on inputs E2, E3, E4 of the IC 10, i.e. of the microprocessor; also provided is an indicator block 16, consisting of a larger number of lamps, preferably light-emitting diodes, indicating the respective operating status of the vacuum cleaner and connected to the outputs A2 to A7 of the IC.

An external memory constituting a so-called EEPROM, which bears the reference number 17 and is connected to inputs/outputs PC1, PC2, PC3, PC4 of the IC, can be provided to store specific or even individual data for the particular unit possessing the activation circuit. It is of course understood that this memory can also be organized internally in the IC.

A vacuum sensor 18, allowing automatic operation of the vacuum cleaner regulated to a constant suction power, comprises two vacuum switches UDS1 and UDS2 set to different vacuum values, which are connected to inputs E5 and E6 of the IC.

The circuit is completed by an external quartz circuit 18 a of the IC, as well as a reset circuit 19 that resets the IC to a defined initial circuit state when the unit is switched back on.

In addition to several rectifier and Zener diodes, the power circuit element comprises capacitors and series resistors to smooth out the supply voltage; the voltage sensor 14 consists of a series circuit, connected to the motor terminals, comprising a rectifier diode Ds and a series resistor Rs, as well as a parallel circuit connected thereto, comprising an RC section made up of the resistor Rs' and the capacitor Cs. The result is to produce at capacitor Cs of the RC section a smoothed DC value that is linked to the voltage present at the electric motor M, but does not by any means indicate its effective value; because the electric motor M is activated via a phase-angle circuit this is in fact impossible, because of the irregularity resulting from the different angular points of the alternating current half-waves.

The voltage sensor output DC voltage passes to input E1 of the IC 10, where it is digitized by an analog/digital converter and then additionally processed.

This additional processing to yield an analyzable effective value indicating the motor supply voltage is accomplished by means of conditioning data stored in table form, for example in the external memory 17, which indicate the correct effective value for each DC voltage value measured by the voltage sensor; in addition, the instantaneous phase angle is also taken into account, this being known in any case by the microprocessor controlling the phase-angle circuit 12, since the latter angle is defined by it. The tables also take into account the line frequency, so that it is possible to keep the power output or power consumption of the electric motor precisely constant while taking into account the true effective value of the actual voltage obtained from the table values, said voltage being compared with the setpoint voltages for the desired power output which are partly determined by the manual activation block.

The basic function of the circuit depicted in FIG. 1 therefore proceeds so that appropriate actuation of the up or down pushbuttons sets a specific output value, either by repeatedly pressing the particular button until a corresponding lighted display has jumped to the desired output value, or also by actuating the buttons for a predefined period of time for increasing output requirements (up switch) or lower output requirements (down switch), whereupon the system is then continuously switched to higher setpoint comparative voltages for power output, or to lower setpoint comparative voltages.

These changes in setpoint are accompanied by a corresponding external display via the light-emitting diodes of the display block 16; in the embodiment depicted, which is to be understood only as exemplary, four different manually settable power data can be displayed sequentially or as a lighted bar by means of green light-emitting diodes LED1 to LED4, which for example can cover—in order here again to provide quantitative information that does not, however, limit the invention—vacuum cleaner output values of 300, 400, 700, and 900 watts.

Also provided is a separate "boost" switch 15c—the up and down switches are labeled 15a and 15b, respectively—whose purpose is to boost the vacuum cleaner briefly to the highest possible power output, which is maintained for a predefined time period determined by the IC and from which the control circuit then automatically flips back down with suitable latching characteristics, so that operation does not occur continuously in boost mode, which in any case presents the risk that the motor would be damaged by the excess voltage delivered to it. The boost mode is indicated by a red light-emitting diode $LED_B$.

It is evident that in this manner, and on the basis of the features indicated, it is possible to set absolutely constant output data for the vacuum cleaner largely irrespective of the external line power, whether the latter is, for example, 180 or 260 volts, and irrespective of the line frequency values, since because of the sensor interrogation of the supply voltage present at electric motor M and delivered via the phase-angle controller, conversion into true effective value data incorporating values stored in table form, and subsequent comparison with constant setpoint voltages, eliminates line voltage fluctuations and switches out different line voltages because of the fact that the phase-angle controller whose characteristics are defined by the IC, by appropriately shifting the phase angle in the defective supply voltage, can always maintain the manually defined desired output data.

In this connection it is understood that in its overall design the circuit must operate with a certain parameter which ensures that even with a supplied voltage of only, for example, 180 volts (this being taken as an example of the lowest voltage that can still be compensated for or intercepted by the circuit according to the invention), the same ultimate output data are achieved as with a supply voltage of 260 volts, at which the circuit must then be regulated sharply downward, i.e. it must operate with a late firing angle in the phase-angle controller so as to maintain the desired predefined output data at this high supply voltage.

Lastly, the circuit previously described is additionally supplemented with an automatic mode which is displayed by a green light-emitting diode $LED_A$ and for the implementation of which, in the exemplary embodiment depicted, only two vacuum switches UDS1 and UDS2 are provided in the suction pipe as actual value sensors for the vacuum present in the suction pipe. These vacuum switches operate according to the basic principle indicated in EP 0 379 680 B1 already mentioned previously, so that no further discussion of the configuration and function of this automatic mode is necessary; the automatic mode can be switched on, for example, by the fact that repeated actuation of the down button 15b causes a transition to the automatic mode as its end position, displayed by means of light-emitting diode $LED_A$. Voltage regulation is then abandoned, since now a true suction pipe vacuum regulation system is in effect, governed by different conditions as described in EP *0 379 680 B1*.

The reset circuit 19 comprises a supply voltage sensor capacitor C, the circuit being designed so that if the unit switches off for even a short time, the latter still discharges to such a degree that upon reactivation, an initial charging current pulse occurs at capacitor C that is sufficient to make a downstream transistor T conduct, and reliably reset the reset input of IC 10.

In the process, the (external) memory block 17 still contains stored data used for initialization; for example, a user must be prevented from continuously activating the boost mode by switching the unit briefly off and on in order to override internal inhibition of boost interrogation, and immediately returning to the boost mode by actuating switch 15c. The previous circuit "history" is also stored in the external memory, preventing, for example, immediate transition to the boost mode when the unit is switched back on in cases when the unit was, for example, switched off in the boost mode.

Figure 2:
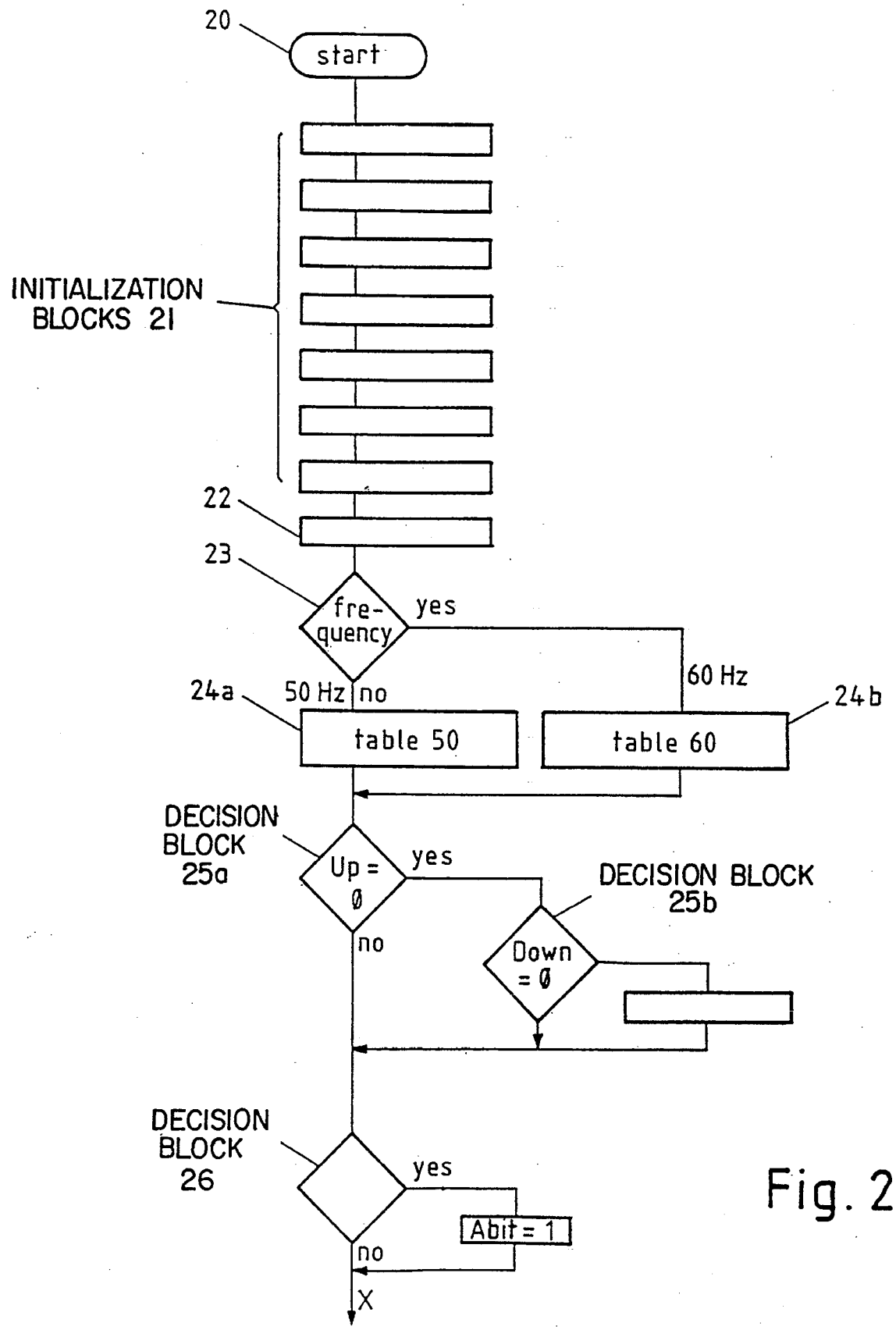
FIGS. 2 and 3 show a flow chart for the regulating circuit.
Figure 3:
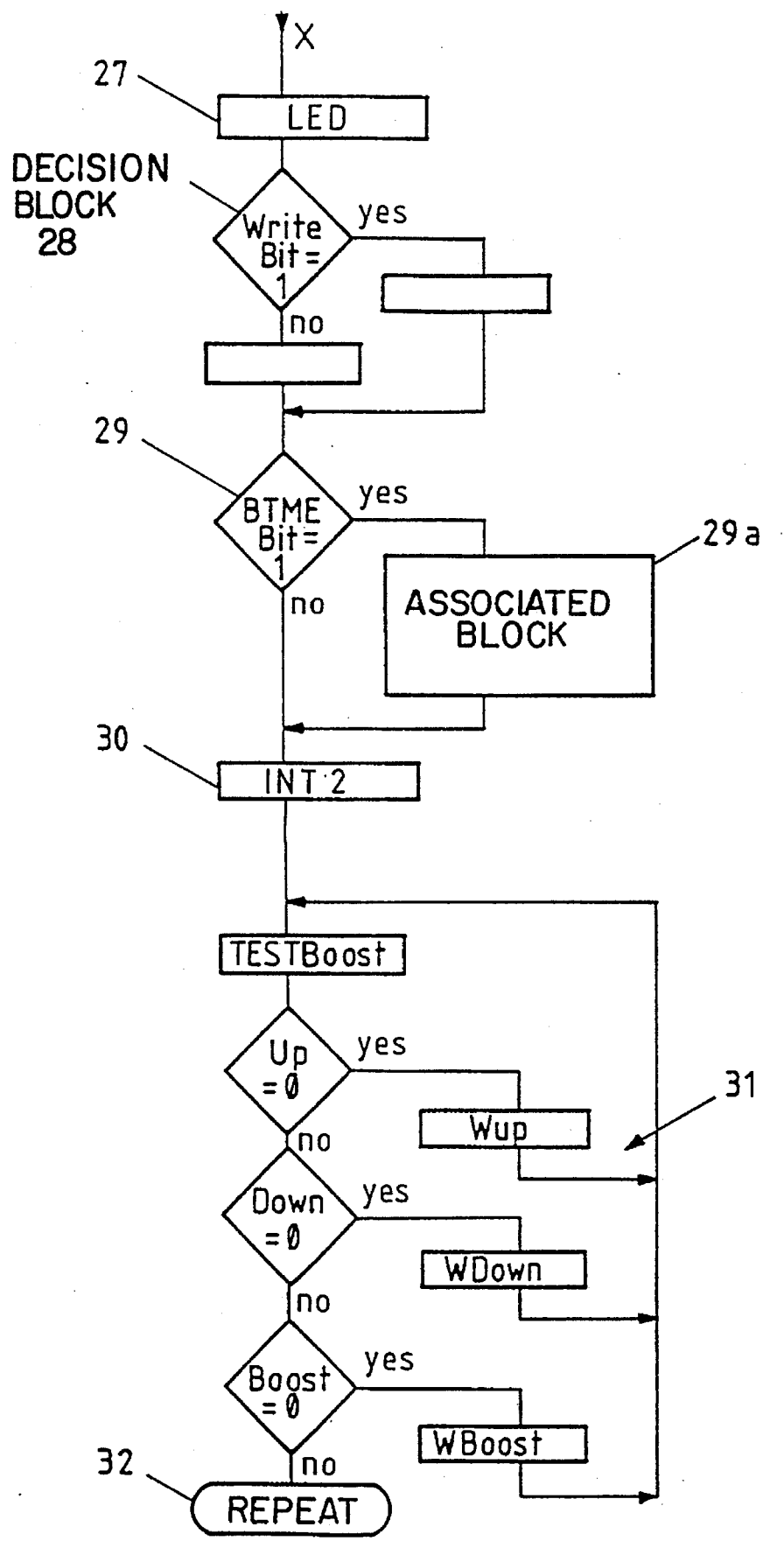

The operating sequence flow chart given in FIGS. 2 and 3 contains initialization blocks 21, downstream from a start block 20, which are followed by a stage 22 which the relevant line frequency is detected (Hertz test).

Depending on the frequency observed, a subsequent switching stage 23 switches to table 50 or table 60 of the external memory 17 so that the correct initial comparison values are available for determining effective voltage values and the desired output setting for the electric motor.

The table transfer blocks 24a, 24b are followed by two further decision blocks 25a, 25b providing another deliberate option offered to the user, namely that the up/down buttons have already been held down while the unit is switched on, as a result of which various initial states can be implemented. Usually the circuit is designed so that the unit begins in the operation position in which it was switched off; initial actuation of these buttons also allows other settings.

The decision block 26 which follows determines whether the automatic mode was activated on shutdown; if so, a bit is set to 1.

There then follows an LED output subroutine at block 27, outputting the LED that is actually to be activated on the basis of the operating mode that is in effect.

This is followed by a further decision block 28 which ensures that when a write bit=1, the respective operating state can be written into the (external) memory 17. The write bit would, for example, be 0 if the up/down buttons were pressed as the unit was switched on.

There then follows a decision block 29 which determines whether a boost state is present or was present when the unit was last shut down; in this case a boost bit=1, and appropriate counters and decision criteria then pass to the associated block 29a, in order to prevent boost mode from being switched on again, for example.

The next block 30 releases an interrupt to activate the phase-angle controller; i.e. up to this point in time there has not yet been any control of outputs by the IC.

There then follow a number of decision blocks and function circuits which are associated with a "pushbutton interrogation" program loop; this program loop 31 then continuously repeats, as characterized by block 32.

In conclusion, it should be noted that the claims and in particular the main claim are attempts to state the invention without a comprehensive knowledge of the prior art, and are therefore without limiting prejudice. The right is therefore reserved to regard all features presented in the specification, the claims, and the drawings, both individually and in any combination with one another, as essential to the invention, and to state them in the claims; and to reduce the feature content of the main claim.

We claim:

1. An apparatus for regulating the power consumption of a vacuum cleaner of the type having a fan which is driven by an electric motor, comprising:

means for sensing a voltage across the electric motor;

means for digitizing the sensed voltage to define a digitized and sensed voltage; and a microprocessor, the microprocessor including:

means for processing the digitized and sensed voltage by relating the digitized and sensed voltage to an actual effective voltage that has been delivered to the electric motor using stored or table values to thereby determine the actual effective voltage;

comparing means for comparing the determined actual effective voltage to a predetermined one of a plurality of operating modes;

a phase-angle determining circuit for determining the phase angle of a current supplied to the electric motor at the moment the voltage across the electric motor is sensed; and regulating means for regulating the power consumption of the vacuum cleaner in response to the output value of the comparing means by activating the phase-angle circuit, whereby power consumption in the vacuum cleaner is maintained generally constant regardless of supply line voltage or frequency variations.

2. The apparatus as in claim 1, wherein the stored or table value that is used in the means for processing the digitized and sensed voltage corresponds to the phase angle of the current at the moment the voltage across the electric motor was sensed.

3. The apparatus as in claim 1, further comprising:

at least one button for selecting a first power level for the predetermined operating mode.

4. The apparatus as in claim 3, further comprising:

a user selectable boost mode which provides a power level greater than the first power level for a predefined period of time.

5. The apparatus as in claim 1, further comprising:

a display means for the displaying which predetermined operating mode is selected.

6. The apparatus as in claim 1, wherein the regulating means is implemented in a microprocessor.

7. The apparatus as in claim 1, further comprising an external memory for storing the stored or table values.

8. The apparatus as in claim 3, wherein the external memory for storing the stored or table values also stores historical data relating to the predetermined operating mode.

9. The apparatus as in claim 1, wherein the means for processing comprises a rectifier, a smoothing circuit, and an analog-to-digital converter.

\* \* \* \* \*